United States Patent
Kim

(10) Patent No.: US 8,413,002 B2
(45) Date of Patent: Apr. 2, 2013

(54) METHOD OF PERFORMING ARQ PROCEDURE FOR TRANSMITTING HIGH RATE DATA

(75) Inventor: Jin Ju Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 482 days.

(21) Appl. No.: 12/679,295

(22) PCT Filed: Oct. 14, 2008

(86) PCT No.: PCT/KR2008/006043
§ 371 (c)(1),
(2), (4) Date: Mar. 19, 2010

(87) PCT Pub. No.: WO2009/051386
PCT Pub. Date: Apr. 23, 2009

(65) Prior Publication Data
US 2010/0257423 A1    Oct. 7, 2010

(30) Foreign Application Priority Data
Oct. 16, 2007  (KR) .......................... 10-2007-0104210

(51) Int. Cl.
*H04L 1/18* (2006.01)
*G08C 25/02* (2006.01)
(52) U.S. Cl. ....................................................... 714/748
(58) Field of Classification Search .......... 714/748–750; 370/326, 338, 329
See application file for complete search history.

(56) References Cited

U.S. PATENT DOCUMENTS

| 6,697,987 | B2 |  | 2/2004 | Lee et al. |
| 7,440,435 | B2 | * | 10/2008 | Lim et al. ...................... 370/338 |
| 7,522,526 | B2 | * | 4/2009 | Yi et al. ........................ 370/236 |
| 7,752,519 | B2 | * | 7/2010 | Yeo et al. ...................... 714/748 |
| 8,254,315 | B2 | * | 8/2012 | Suzuki et al. ................. 370/329 |
| 2002/0021698 | A1 |  | 2/2002 | Lee et al. |

FOREIGN PATENT DOCUMENTS

| KR | 10-2005-0069902 | 7/2005 |
| KR | 10-2006-0100081 | 9/2006 |

* cited by examiner

*Primary Examiner* — Shelly A Chase

(74) *Attorney, Agent, or Firm* — Lee, Hong, Degerman, Kang & Waimey

(57) ABSTRACT

A data transmission method using automatic repeat request (ARQ) in a radio interface protocol system consisting of a plurality of layers is provided. The method includes delivering, from an upper layer to a lower layer, a data block stored in an ARQ buffer, the ARQ buffer storing a plurality of data blocks to be transmitted in response the lower layer, the data block; delivering, from the upper layer to the lower layer, a new data block stored in the ARQ buffer if a delivery success message is received from the lower layer, the delivery success message indicating successful transmission of the data block; and shifting a window of the ARQ buffer. The present invention can effectively use radio resources since an ARQ procedure does not require a polling process and a process of receiving a status PDU, and is suitable for high rate data transmission.

11 Claims, 7 Drawing Sheets

METHOD OF PERFORMING ARQ PROCEDURE FOR TRANSMITTING HIGH RATE DATA

CROSS-REFERENCE TO RELATED APPLICATIONS

This application is the National Stage filing under 35 U.S.C. 371 of International Application No. PCT/KR2008/006043, filed on Oct. 14, 2008, which claims the benefit of earlier filing date and right of priority to Korean Application No. 10-2007-0104210, filed on Oct. 16, 2007.

TECHNICAL FIELD

The present invention relates to wireless communications, and more particularly, to a method of performing an RLC ARQ procedure for transmitting high rate data.

BACKGROUND ART

Next generation mobile communication systems have been standardized aiming at providing integrated services and effective interoperations between a wired communication network and a wireless communication network, beyond a simple wireless communication service provided in the conventional mobile communication systems. With the demand on a high-speed, large-volume data communication system for processing and transmitting a variety of information such as radio data as well as providing voice-oriented services, there is a need for developing a technique for transmitting large-volume data through the wireless communication network whose capacity is similar to that of the wired communication network.

Therefore, a method of properly detecting errors is essential for minimizing data loss and for improving system performance by increasing system transmission efficiency. An automatic repeat request (ARQ) procedure is a process in which, if a receiver successfully receives data, an acknowledgment (ACK) signal is feedback to a transmitter, and if the receiver unsuccessfully receives the data, a not-acknowledgment (NACK) signal is fed back to the transmitter.

Layers of a radio interface protocol between a user equipment and a base station can be classified into a first layer (L1), a second layer (L2), and a third layer (L3) based on the lower three layers of the open system interconnection (OSI) model that is well-known in a communication system.

Each layer operates independently. Even if errors occur, each layer independently performs a basic operation for self-recovery. However, when communication is achieved between the base station and the user equipment, if separate ACK/NACK signals are exchanged between lower layers which are divided from one layer, the same operation is unnecessarily repeated for the same data, thereby causing deterioration in a data throughput required to transmit high rate data.

For example, a medium access control (MAC) layer and a radio link control (RLC) layer are lower layers belonging to the same layer (i.e., second layer) in a layer structure of the radio interface protocol. However, if the MAC layers of the base station and the user equipment exchange an ACK/NACK signal for the same data (i.e., a HARQ procedure) while the RLC layers of the base station and the user equipment exchange another ACK/NACK signal (i.e., an ARQ procedure), waste of resources occurs due to repetitive resource allocation and also a delay occurs in the data transfer of the RLC layers.

Accordingly, there is a need for a method capable of reducing unnecessary resource allocation by using an improved ARQ (or HARQ) procedure between layers and capable of improving a data transfer rate.

DISCLOSURE OF INVENTION

Technical Problem

The present invention provides a method of performing an RLC ARQ procedure for transmitting high rate data.

Technical Solution

According to an aspect of the present invention, a data transmission method using automatic repeat request (ARQ) in a radio interface protocol system consisting of a plurality of layers is provided. The method includes delivering, from an upper layer to a lower layer, a data block stored in an ARQ buffer, the ARQ buffer storing a plurality of data blocks to be transmitted in response to the ARQ; transmitting, by the lower layer, the data block; delivering, from the upper layer to the lower layer, a new data block stored in the ARQ buffer if a delivery success message is received from the lower layer, the delivery success message indicating successful transmission of the data block; and shifting a window of the ARQ buffer.

According to another aspect of the present invention, a data transmission method is provided. The method includes performing, by a MAC layer, a hybrid ARQ (HARQ) procedure on a MAC PDU; and performing, by the RLC layer, an ARQ procedure for retransmitting an RLC PDU corresponding to the MAC PDU if the RLC layer receives from the MAC layer a delivery failure message indicating unsuccessful transmission of the MAC PDU, and performing, by the RLC layer, the ARQ procedure for transmitting a new RLC PDU if the RLC layer receives from the MAC layer a delivery success message indicating successful transmission of the MAC PDU.

Advantageous Effects

The present invention can effectively use radio resources since an ARQ procedure does not require a polling process and a process of receiving a status PDU, and is suitable for high rate data transmission. In addition, since a HARQ feedback condition is immediately considered when an RLC PDU is transmitted, a transmission window can be moved at a faster speed.

MODE FOR THE INVENTION

Figure 1:
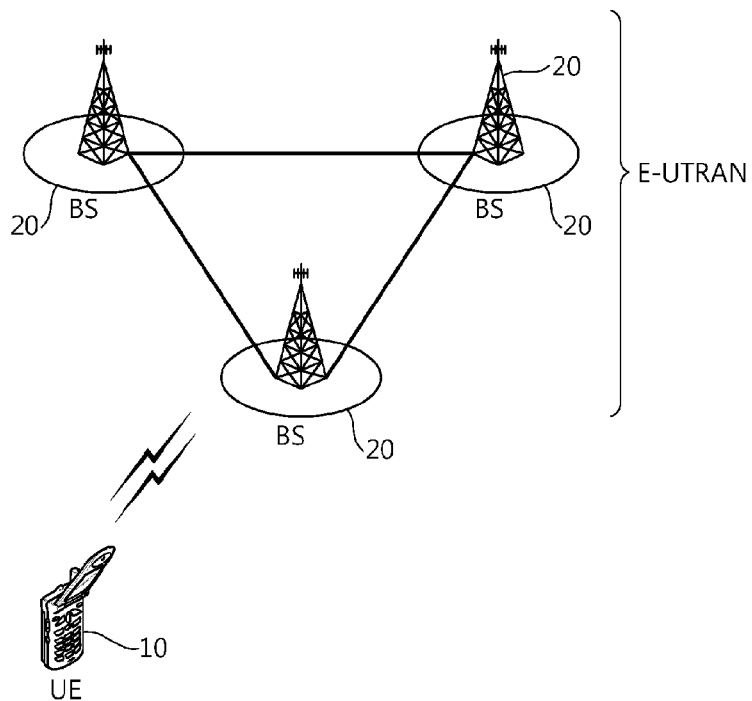
FIG. 1 shows a wireless communication system.

FIG. 1 shows a wireless communication system. The wireless communication system may have a network structure of an evolved-universal mobile telecommunications system (E-UMTS). The E-UMTS may be referred to as a long-term evolution (LTE) system. The wireless communication system can be widely deployed to provide a variety of communication services, such as voices, packet data, etc.

Referring to FIG. 1, an evolved-UMTS terrestrial radio access network (E-UTRAN) includes at least one base station (BS) 20. A user equipment (UE) 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as an evolved node-B (eNB), a base transceiver system (BTS), an access point, etc. There are one or more cells within the coverage of the BS 20. Interfaces for transmitting user traffic or control traffic may be used between the BSs 20. Hereinafter, downlink is defined as a communication link from the BS 20 to the UE 10, and uplink is defined as a communication link from the UE 10 to the BS 20.

Meanwhile, layers of a radio interface protocol between the UE and the BS are a physical layer, a medium access control (MAC) layer, a radio link control (RLC) layer, a packet data convergence protocol (PDCP) layer, a broadcast/multicast control (BMC) layer, and a radio resource control (RRC) layer.

The layers of the radio interface protocol can be classified into a first layer (L1), a second layer (L2), and a third layer (L3) based on the lower three layers of the open system interconnection (OSI) model that is well-known in a communication system. In comparison with the OSI model, the physical layer corresponds to L1. The MAC layer, the RLC layer, and the PDCP layer (i.e., upper layers of the physical layer) correspond to L2. The RRC layer corresponds to L3.

A data block transmitted from an upper layer to a lower layer and a data block transmitted from the lower layer to the upper layer can be distinctively defined. For example, a data block generated by the RLC layer (i.e., upper layer) and transmitted to the MAC layer (i.e., lower layer) is defined as an RLC protocol data unit (PDU), and a data block generated by the MAC layer (i.e., lower layer) and transmitted to the physical layer (i.e., further lower layer) is defined as a MAC PDU. That is, the data block has a broader concept including the RLC PDU, the MAC PDU, etc.

The layer structure of the radio interface protocol can be equally applied to the UE and the E-UTRAN. In the UE, all protocols are included in one entity. In the E-UTRAN, all protocols may be distributed for each network entity.

There are two regions, i.e., a user plane and a control plane, according to a type of data transmitted in the aforementioned protocol architecture. The user plane is a region where user traffic information (i.e., voice, IP packet, etc.) is transmitted. The control plane is a region where control information (i.e., network interface, call maintenance and management, etc.) is transmitted. The RLC layer may belong to either the user plane or the control plane according to a type of an upper layer connected thereto. That is, if the RLC layer is connected to the RRC layer, the RLC layer may belong to the control plane, and otherwise, may belong to the user plane.

Figure 2:
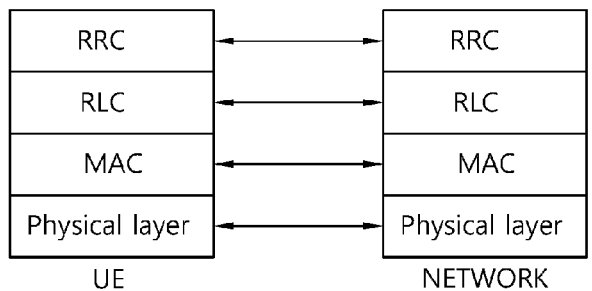
FIG. 2 is a diagram showing a control plane of a radio interface protocol.
Figure 3:
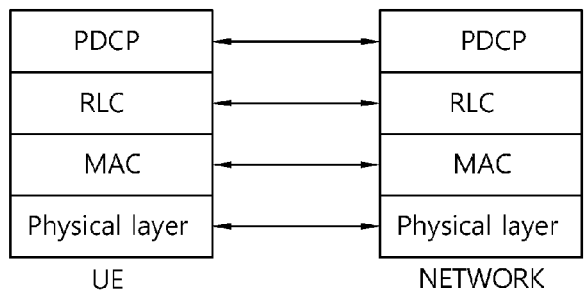
FIG. 3 is a diagram showing a user plane of a radio interface protocol.

FIG. 2 is a diagram showing a control plane of a radio interface protocol. FIG. 3 is a diagram showing a user plane of a radio interface protocol.

Referring to FIGS. 2 and 3, a physical layer (i.e., first layer) provides an upper layer with an information transfer service on a physical channel. The physical layer is coupled with a media access control (MAC) layer, i.e., an upper layer of the physical layer, via a transport channel. Data is transferred between the MAC layer and the physical layer on the transport channel. In addition, data is transferred between different physical layers, i.e., between physical layers of a transmitting side and a receiving side.

Techniques such as data multiplexing, channel coding, spreading, modulation, etc., are applied to the physical layer. Moreover, since a radio signal is occasionally changed in a radio environment according to a movement of UE or a surrounding environment, various methods capable of compensating for the changes are required.

A radio data link layer belonging to the second layer consists of a MAC layer, an RLC layer, and a PDCP layer. The MAC layer of the second layer serves for mapping between a logical channel and a transport channel. The MAC layer selects a suitable transport channel to transmit data delivered from the RLC layer, and appends necessary control information to a header of a MAC protocol data unit (PDU). Examples of a special function of the MAC layer include a radio resource management function and a measurement function.

First, the radio resource management function is a function for controlling data transmission by defining an operation of the MAC layer on the basis of various MAC parameters transmitted from an upper RRC layer. By using the radio resource management function, the MAC layer can change a mapping relation between the logical channel and the transport channel or can multiplex data by using a scheduling function.

Next, the measurement function is a function for measuring a traffic volume of the UE and for reporting the measurement result to the E-UTRAN. On the basis of information measured by the MAC layer of the UE, the E-UTRAN can change a configuration of the MAC layer, and thus can effectively manage a radio resource.

The RLC layer of the second layer is located above the MAC layer and supports reliably data transmission. Further, the RLC layer segments and concatenates RLC service data units (SDUs) delivered from an upper layer so that data is configured to have a size suitable for a wireless section. In a receiving side, the RLC layer supports a data reassembly function to restore an original RLC SDU from the received RLC PDUs.

Each RLC entity can operate in a transparent mode (TM), an unacknowledged mode (UM), or an acknowledged mode (AM) according to RLC SDU processing and a transmission scheme. For all RLC modes, CRC error detection is performed in a physical layer. Then, a result of CRC checking is delivered to the RLC layer together with actual data.

When in the TM, the RLC layer transmits data to the MAC layer through the transport channel without appending a protocol header to the RLC PDU. If a transmission error is detected in the RLC PDU, the RLC PDU is removed or the occurrence of error is marked. The TM can be used when upper layer data has a streaming format. In this case, the upper layer data is not segmented. A segmentation/reassembly function can be used restrictively in a particular case.

When in the UM, data delivery is not guaranteed since a retransmission protocol is not used. A transmitter deletes data according to a timer without using accurate singling. Thus, RLC PDUs which have not been transmitted within a specific time period are directly removed from a transmission buffer. A PDU includes a sequence number (SN) and thus can observe integrity of an upper layer PDU. An RLC entity operating in the UM is defined to be unidirectional since a relation between uplink and downlink is unnecessary. For example, a user service that can use a UM RLC entity may be a cell broadcast service and a voice over Internet protocol (VoIP).

For error correction, an ARQ procedure is used in the AM. In a situation where the RLC PDU is not properly delivered (e.g., when a maximum number of retransmissions is exceeded or when a transmission time is over), the RLC layer reports this situation to an upper layer and removes the RLC PDU from a buffer. An AM RLC entity has a retransmission function and thus provides a bidirectional service.

For the transmission function of AM, various parameters and variables are used, such as, a transmission (Tx) window, a reception (Rx) window, a timer, a counter, etc. The Tx window corresponds to a maximum number of RLC PDUs that can be transmitted in a state where a status PDU is not received from a receiver.

The PDCP layer of the second layer is used only in a packet exchange region. To increase transmission efficiency of packet data in a radio channel, the PDCP layer can transmit data by compressing a header of an IP packet.

The RRC layer belonging to the third layer is defined only in the control plane. The RRC layer serves to control the logical channel, the transport channel, and the physical channel in association with configuration, reconfiguration, and release of radio bearers (RBs). From the perspective of a concept of bearer service provided in the E-UTRAN, a data transfer service through an RB is provided between the UE and the UTRAN. More precisely, a transfer service of data provided to an upper layer by the second layer can be defined using the RB. Therefore, a characteristic of RB is determined according to characteristics of a lower protocol layer, a transport channel, a physical channel, etc.

To distinguish from a typical RB for transmitting user data, an RB for transmitting control plane data is referred to as a signaling radio bearer (SRB). The RB can provide a bidirectional or unidirectional service to an upper layer. Directivity of the provided service can be determined by an RLC entity in use. For example, an AM RLC entity provides a bidirectional data transfer service, and an RLC entity operating in the UM or the TM provides only a unidirectional service. Up to 32 RBs can be defined between the UE and the E-UTRAN, and some of them (i.e., 4 or 5 RBs) are allocated to a signaling RB.

Between the RRC layer of the UE and the RRC layer of the E-UTRAN, various RRC procedures are defined to mutually exchange control information. Most RRC procedures are used for the purpose of defining and controlling functions of the UE. In addition, an RRC message may include control messages conforming to a non-access stratum (NAS) protocol. These control messages are not read in the E-UTRAN but transparently delivered to the UE or a core network.

Hereinafter, the present invention will be described by classifying a radio interface protocol layer into an RLC layer and a MAC layer. The RLC layer may correspond to a typical upper layer. The MAC layer may correspond to a typical lower layer. An RLC PDU or a MAC PDU corresponds to a data block, and thus can be used together with the data block.

Figure 4:
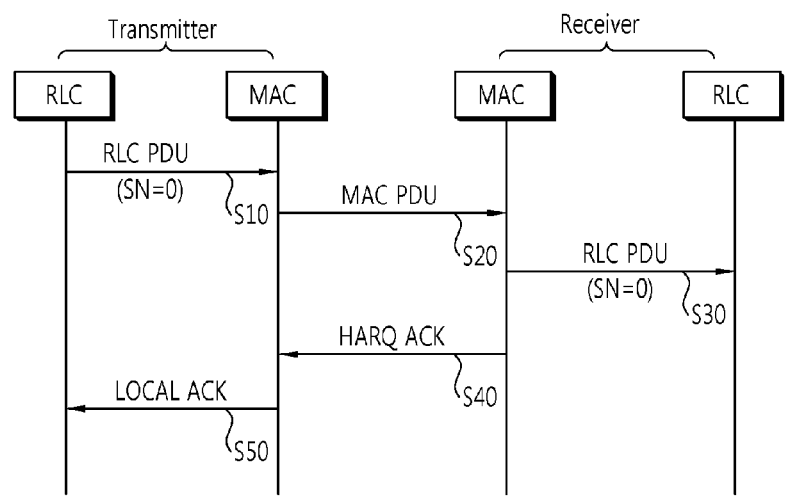
FIG. 4 is a flow diagram showing a method of performing an ARQ procedure in an RLC layer according to an embodiment of the present invention.

FIG. 4 is a flow diagram showing a method of performing an ARQ procedure in an RLC layer according to an embodiment of the present invention.

Referring to FIG. 4, a transmitter sends an RLC PDU (SN=0) to a MAC layer (step S10). The transmitter transmits a MAC PDU (step S20). The RLC PDU delivered from an RLC layer is mapped to a MAC PDU of a transport channel. The MAC PDU is transmitted to a receiver through a physical channel. A MAC layer of the receiver receives the MAC PDU. The receiver sends an RLC PDU(SN=0) to an RLC layer (step S30). The MAC layer of the receiver sends the received MAC PDU to the RLC layer. In this case, the RLC layer of the receiver does not transmit an additional status PDU to the transmitter even if the RLC PDU(SN=0) is successfully received.

The receiver transmits an HARQ ACK signal (step S40). For convenience, physical layers are not shown in the figure. The physical layer performs an HARQ procedure. According to the HARQ procedure performed by the physical layer of the receiver, the HARQ ACK signal is delivered to the MAC layer of the transmitter. The MAC layer of the transmitter sends a local ACK to the RLC layer (step S50).

The RLC layer of the transmitter does not receive the status PDU (i.e., ACK/NACK information transmitted from the receiver to the transmitter in an RLC PDU unit) from the RLC layer of the receiver. Instead, a result of the HARQ procedure is reported from the MAC layer of the transmitter. Hereinafter, a notification indicating that the result of the HARQ procedure is reported from the MAC layer of the transmitter to the RLC layer is referred to as a local ACK/NACK or a message indicating a success or failure of transmission. When the MAC layer of the transmitter receives an ACK signal for a specific data block from the receiver by using the HARQ procedure, the local ACK is a delivery success message that reports successful transmission of the data block to the RLC layer. The local NACK is a delivery failure message for reporting that transmission is unsuccessful even if the specific data block is transmitted using the HARQ by a maximum number of retransmissions.

The transmitter shifts a starting point (or a lower edge) of a Tx window to a position where an RLC PDU corresponding to a new SN 1 exists. In a case where the RLC layer of the transmitter receives the local ACK for the RLC PDU from the MAC layer, the starting point of the Tx window is shifted to an RLC PDU of a next SN.

According to a conventional method, when a transmitter transmits an RLC PDU, a receiver additionally transmits a status PDU to the transmitter in an RLC layer level to report whether the RLC PDU is successfully received. That is, in addition to the HARQ procedure between lower layers (i.e., MAC layers) of the transmitter and the receiver, the conventional method further comprises an ARQ procedure between upper layers (i.e., RLC layers). Further, in the conventional method, the transmitter performs RLC polling to receive the status PDU. When it is considered that a similar HARQ procedure is performed in a lower layer including a MAC layer to determine whether to perform retransmission, the conventional method is not suitable for high rate data transmission since two similar procedures are repeatedly performed.

In particular, when the status PDU for the RLC PDU corresponding to the MAC PDU is not received even if ACK is determined for the MAC PDU in the HARQ procedure, the transmitter cannot transmit the RLC PDU any longer and thus performs unnecessary retransmission for polling. This occurs because, even if the MAC layer receives an HARQ ACK, the system cannot report this situation to the RLC layer.

On the other hand, the present invention can perform the ARQ procedure without parameters used for RLC polling and parameters used to report a reception status of the RLC PDU. The parameters used for RLC polling are 'Last PDU in buffer', 'Last PDU in Retransmission buffer', 'Poll timer', 'Every Poll_PDU PDU', 'Every Poll_SDU SDU', 'Window based', and 'Timer based'. The parameters used to report the reception status of the RLC PDU are 'Timer status periodic', 'Timer status prohibit', and 'missing PDU detected'. Accordingly, an overhead is decreased, and more resources can be allocated to an RLC data PDU.

In addition, since a delay time generated by polling and by transmission and reception of the status PDU can be avoided, an RLC PDU transmission error can be promptly dealt with, and high rate data can be properly transmitted. This is possible since the MAC layer can deliver a local ACK/NACK to the RLC layer. An interaction between the ARQ of the RLC layer and the HARQ of the MAC layer and other layers below the MAC layer may be found in section 9.3 of 3GPP "Evolved Universal Terrestrial Radio Access (E-UTRA) and Evolved Universal Terrestrial Radio Access Network (E-UTRAN) Overall description Stage 2(Release 8, version 8.1.0)".

Figure 5:
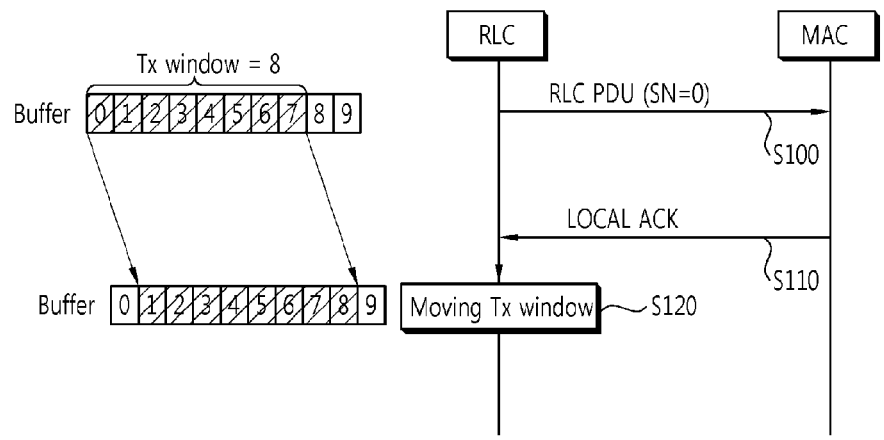
FIG. 5 is a flow diagram illustrating a method of shifting a Tx window in an RLC layer according to an embodiment of the present invention.

FIG. 5 is a flow diagram illustrating a method of shifting a Tx window in an RLC layer according to an embodiment of the present invention. It is assumed herein that the Tx window has a size of 8.

Referring to FIG. 5, the RLC layer sends an RLC PDU (SN=0) to a MAC layer (step S100). A transmitter stores a to-be-transmitted RLC PDU in a Tx buffer, and sequentially sends the RLC PDU to the MAC layer according to a sequence number (SN). In this case, a starting point indicating a starting position of the Tx window is 0. Since the size of the Tx window is 8, the Tx window includes RLC PDUs 0 to 7 in the buffer. The transmitter can transmit only an RLC PDU always included in the Tx window. RLC PDUs not included in the Tx window are transmitted after updating the Tx window.

The MAC layer sends a local ACK to the RLC layer (step S110). Upon receiving an HARQ ACK from a receiver, the MAC layer sends the local ACK to the RLC layer in order to shift the Tx window. In this case, the MAC layer sends SN=0 together to report which RLC PDU is previously transmitted by the RLC layer. The RLC layer shifts the Tx window (step S120). The starting point of the Tx window is incremented by one only when the local ACK is received from the MAC layer. In this case, SNs of the RLC PDUs included in the Tx window are 1 to 8.

In the conventional method, the Tx window is updated upon receiving a status PDU (i.e., ACK/NACK information transmitted from the receiver to the transmitter in an RLC PDU unit) from a receiving side. That is, only after the statue PDU of RLC is received, the Tx window of RLC can be shifted. Therefore, until the status PDU is received from the receiver, the position of the Tx buffer indicated by the Tx window is fixed. On the other hand, according to the present invention, the Tx window can be shifted in every transmission of RLC PDU by using only the HARQ process, thus the buffer can be flexibly operated.

Figure 6:
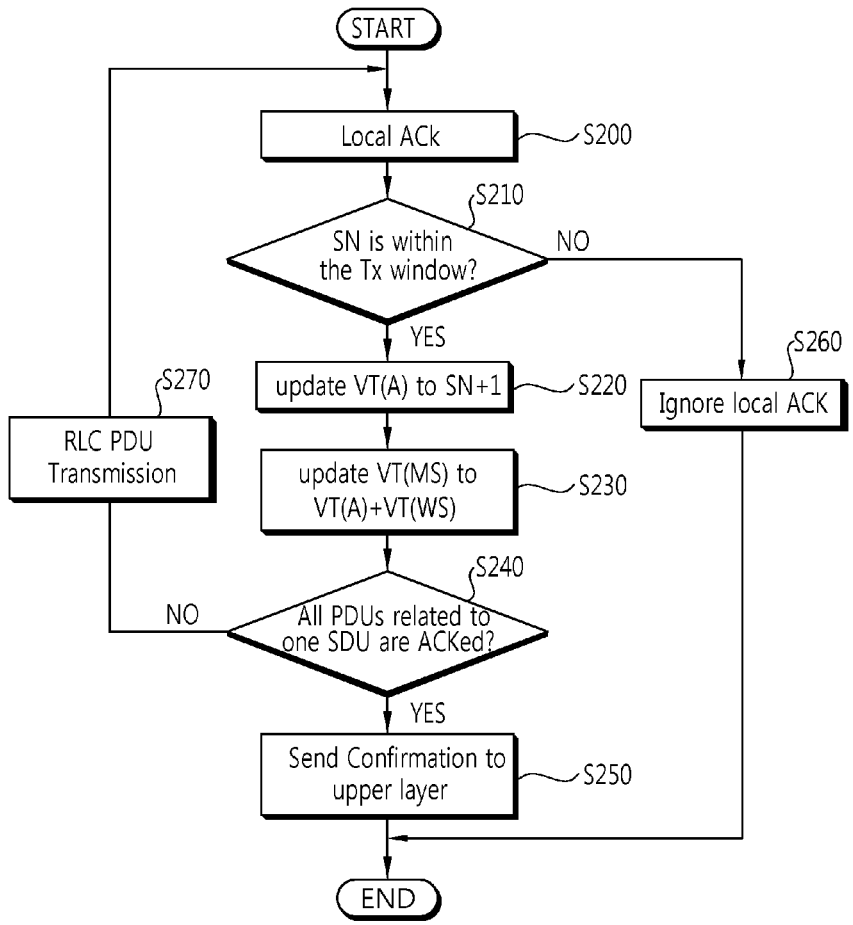
FIG. 6 is a flowchart showing a method of shifting a Tx window when a local ACK is received according to an embodiment of the present invention.

FIG. 6 is a flowchart showing a method of shifting a Tx window when a local ACK is received according to an embodiment of the present invention. Herein, VT(A) denotes an acknowledge state variable, VT(MS) denotes a maximum send state variable, and VT(WS) denotes a transmission window size state variable. This may be found in section 9.4. in TS25.322 of 3GPP "Radio Link Control (RLC) protocol specification (Release 7, version 7.3.0, June 2007)"

Referring to FIG. 6, a local ACK is received from a MAC layer (step S200). It is determined whether an SN of a previously transmitted RLC PDU is within a current Tx window (step S210). If the SN of the RLC PDU is not within the current Tx window, it means that an error occurs, and thus the local ACK is ignored (step S260). Then, the procedure ends.

If the SN of the RLC PDU is within current Tx window, VT(A) is updated to SN+1 (step S220), and VT(MS) is updated to VT(A)+VT(WS) (step S230). Since the local ACK is received, the position of the Tx window is shifted forward by one in a buffer.

It is determined whether an HARQ ACK is received for all PDUs related to one SDU (step S240). If the HARQ ACK is received for all PDUs related to one SDU, confirmation is sent to an upper layer (step S250). Then, the procedure ends. Otherwise, the HARQ ACK is not received for all PDUs related to one SDU, remaining RLC PDUs are transmitted (step S270).

Figure 7:
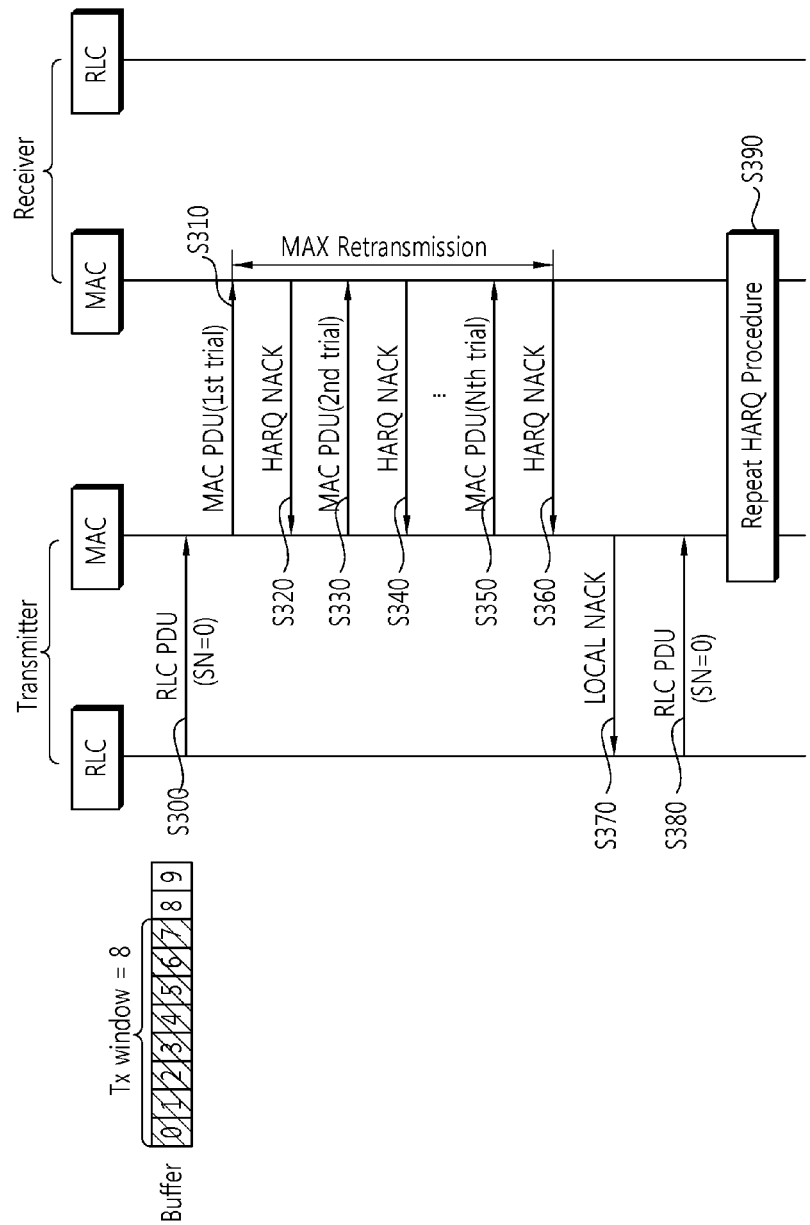
FIG. 7 is a flow diagram showing a method of performing an ARQ procedure in an RLC layer according to another embodiment of the present invention.

FIG. 7 is a flow diagram showing a method of performing an ARQ procedure in an RLC layer according to another embodiment of the present invention. In the method of FIG. 7, retransmission is performed when the RLC layer receives a local NACK. It is assumed herein that a Tx window has a size of 8, and a maximum number of retransmissions of HARQ is N.

Referring to FIG. 7, an RLC layer of a transmitter sends an RLC PDU(SN=0) to a MAC layer (step S300). In this case, a starting point of the Tx window is 0. The MAC layer of the transmitter transmits a MAC PDU corresponding to the RLC PDU(SN=0) (step S310). The RLC PDU is mapped to the MAC PDU on a logical channel. The MAC PDU is again mapped to a transport block (TB) on a transport channel, and is transmitted to a receiver through a physical channel.

The receiver fails in receiving the MAC PDU and thus transmits an HARQ NACK (step S320). The MAC layer of the transmitter retransmits the MAC PDU in response to the HARQ NACK (step S330), and the receiver transmits an HARQ NACK again (step S340). Such a process is repeated N times until the MAC layer of the transmitter retransmits the MAC PDU at Nth retransmission (step S350). The receiver transmits an HARQ NACK in response thereto (step S360).

The MAC layer of the transmitter sends a local NACK to the RLC layer (step S370). Since retransmission has failed even after being performed a number of times corresponding to the maximum number of retransmissions, the MAC layer of the transmitter directly reports this situation to the RLC layer which is an upper layer of the MAC layer. In this case, the MAC layer sends SN=0 together to report which RLC PDU is retransmitted by the RLC layer. The RLC layer sends the RLC PDU(SN=0) again to the MAC layer (step S380). Since the local NACK is received, the Tx window is not shifted forward to a next starting position but maintains its original position.

The MAC layer of the transmitter repeats the HARQ process for a MAC PDU corresponding to the RLC PDU(SN=0) (step S390).

Figure 8:
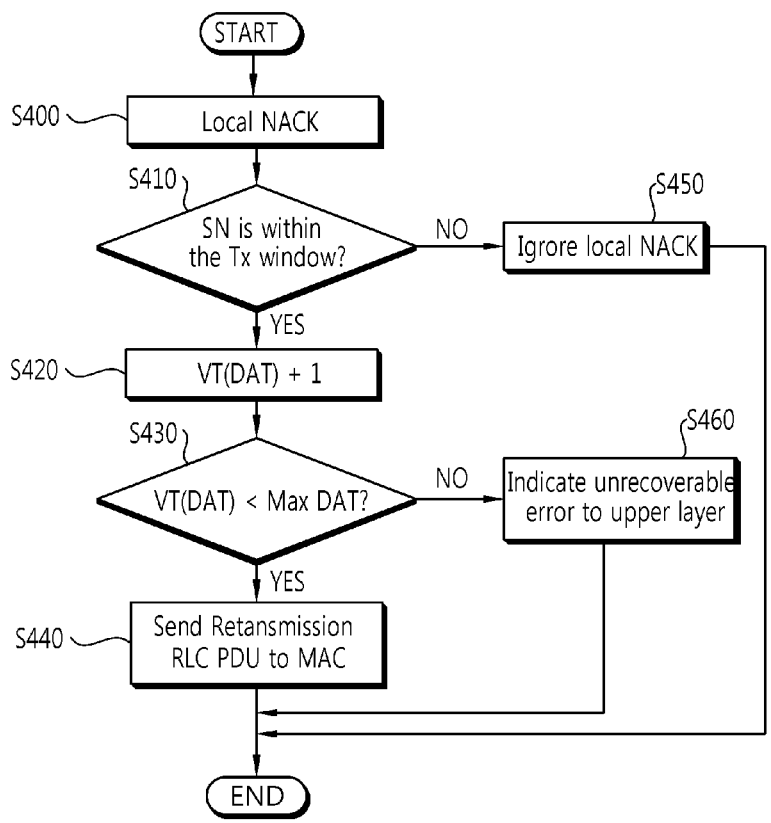
FIG. 8 is a flowchart showing a method of shifting a Tx window when a local ACK is received according to an embodiment of the present invention.

FIG. 8 is a flowchart showing a method of shifting a Tx window when a local ACK is received according to an embodiment of the present invention. Herein, VT(DAT) denotes the number of times of retransmitting an RLC PDU, and MaxDAT denotes a maximum number of times of retransmitting the RLC PDU. The VT(DAT) and the MaxDAT may be found in section 9.4 of TS25.322 "Radio Link Control (RLC) protocol of specification (Release 7, version 7.3.0, June 2007)"

Referring to FIG. 8, an RLC layer receives a local NACK (step S400). It is determined whether an SN of the RLC PDU is within a Tx window (step S410). If the SN of the RLC PDU is not within the Tx window, it means that a transmission error exists, and thus the local NACK is ignored (step S450). Then, the procedure ends.

If the SN of the RLC PDU is within Tx window, VT(DAT) is updated to VT(DAT)+1 (step S420). This is because the RLC PDU has been transmitted in response to the local NACK. It is determined whether VT(DAT) is less than Max-DAT (step S430). If VT(DAT) is less than MaxDAT, it means that retransmission is currently admitted, and thus the RLC PDU is sent to a MAC layer (step S440). If VT(DAT) is greater than or equal to MaxDAT, occurrence of unrecoverable errors is reported to an upper layer (step S460). Then, the procedure ends.

In the conventional method, to determine whether the RLC PDU is successfully transmitted, a transmitter performs polling on a receiver. The transmitter receives a status PDU from the receiver. Upon receiving an ARQ ACK, the transmitter transmits a next RLC PDU. Upon receiving an ARQ NACK, the transmitter retransmits a previously transmitted RLC PDU. Polling is a process for requesting an RLC entity of the receiver to transmit the status PDU. A UMTS uses a method of defining a specific field in an RLC PDU header. On the other hand, the present invention can shift a Tx window by using HARQ ACK/NACK information of a MAC layer without having to use polling. That is, resources of RLC polling are unnecessary, and thus a header field of the RLC PDU can be reduced.

Another example of the present invention may include a method in which, while directly using the RLC polling, a local ACK/NACK is provided only when a MAC layer performs the RLC polling. Since polling is performed in an RLC PDU unit of an RLC entity, if a transmitter simultaneously provides services to a plurality of receivers by using several RBs, a PDU that requires polling may be transmitted on a MAC TB together with a PDU that does not require polling. It may be difficult to implement the method in which the local ACK/NACK is provided only when the MAC layer performs the RLC polling.

Figure 9:
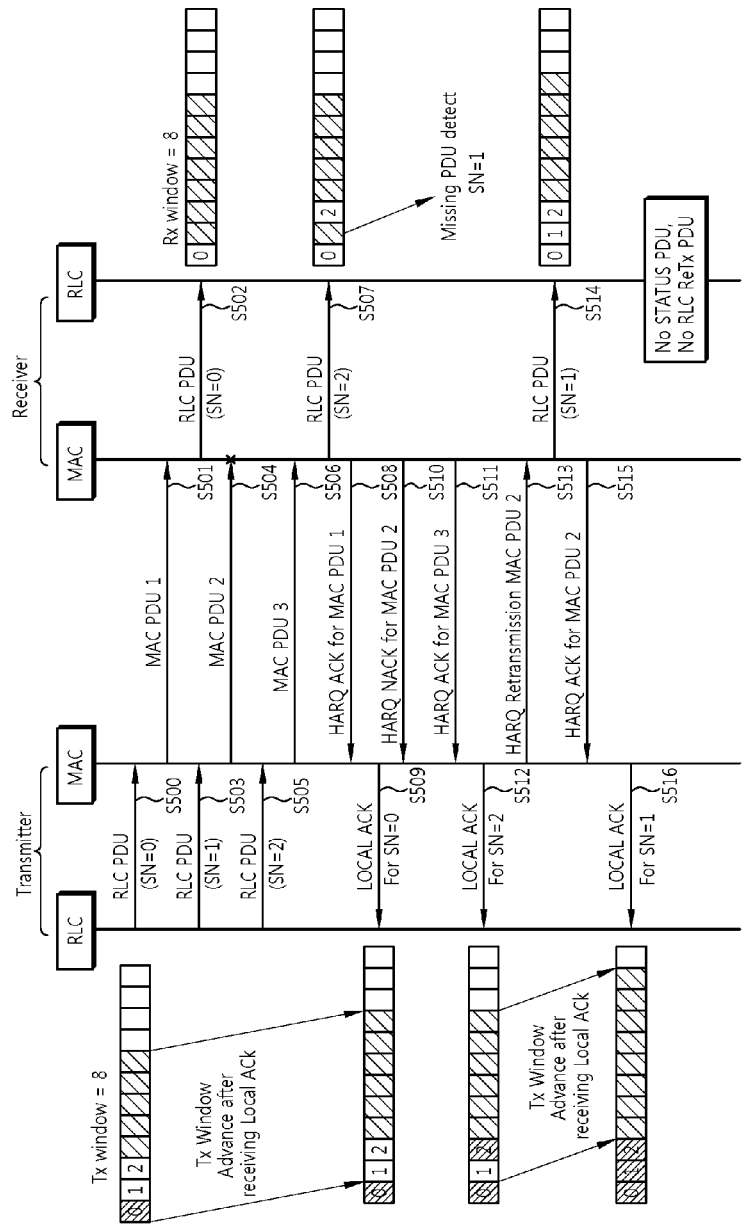
FIG. 9 is a flow diagram showing a method of retransmitting an RLC PDU according to an embodiment of the present invention.

FIG. 9 is a flow diagram showing a method of retransmitting an RLC PDU according to an embodiment of the present invention. It is assumed herein that a Tx window has a size of 8, and a starting point of the Tx window is 0 in a buffer. The method of FIG. 9 is for a case where the number of retransmissions of the RLC PDU is less than MaxDAT (i.e., a local NACK is not transmitted). The RLC PDU is retransmitted in an HARQ procedure of a MAC layer.

Referring to FIG. 9, an RLC layer of a transmitter delivers an RLC PDU(SN=0) to a MAC layer (step S500). The MAC layer transmits a MAC PDU1 corresponding to the RLC PDU(SN=0) to a receiver (step S501). The receiver sends the RLC PDU(SN=0) to an RLC layer (step S502). In this case, the RLC PDU(SN=0) is stored in a buffer of the receiver.

The RLC layer of the transmitter delivers an RLC PDU (SN=1) to the MAC layer (step S503). The MAC layer transmits a MAC PDU2 corresponding to the RLC PDU(SN=1) to the receiver (step S504). However, an HARQ error occurs, and thus the receiver cannot deliver the RLC PDU(SN=1) to the RLC layer.

The RLC layer of the transmitter delivers an RLC PDU (SN=2) to a MAC layer (step S505). The MAC layer transmits a MAC PDU3 corresponding to the RLC PDU(SN=2) to the receiver (step S506). The receiver sends the RLC PDU (SN=2) to the RLC layer (step S507). In this case, the RLC PDU(SN=0) and the RLC PDU(SN=2) are stored in the buffer of the receiver.

The receiver transmits an HARQ ACK for a successfully received MAC PDU1 (step S508). In response thereto, the MAC layer of the transmitter sends a local ACK(SN=0) to the RLC layer (step S509). Since the local ACK is received, the Tx window is shifted to a starting point 1.

The receiver transmits an HARQ NACK for an unsuccessfully received MAC PDU2 (step S510). In response thereto, the transmitter prepares to perform HARQ retransmission. The receiver transmits an HARQ ACK for a successfully received MAC PDU3 (step S511). In response thereto, the MAC layer of the transmitter sends a local ACK(SN=2) to the RLC layer (step S512). Although the local ACK is received for the RLC PDU(SN=2), the Tx window maintains a current state until the local ACK is received for the RLC PDU(SN=1) by performing HARQ retransmission.

The MAC layer of the transmitter attempts retransmission of the MAC PDU2 (step S513). The MAC layer of the receiver successfully receives the MAC PDU2 and sends the RLC PDU(SN=1) to the RLC layer (step S514). In this case, SNs 0 to 2 are stored in the buffer of the receiver.

The MAC layer of the receiver transmits an HARQ ACK for the MAC PDU2 to the transmitter (step S515). The MAC layer of the transmitter sends a local ACK for the RLC PDU (SN=1) to the RLC layer (step S516). Since the local ACK is received for all RLC PDU(SN=0) to RLC PDU(SN=2), the RLC layer shifts the starting point of the Tx window to 3 in the buffer.

As such, since local ACK/NACK information is exchanged between the MAC layer and the RLC layer of the transmitter, the present invention can effectively deal with a transmission error.

Figure 10:
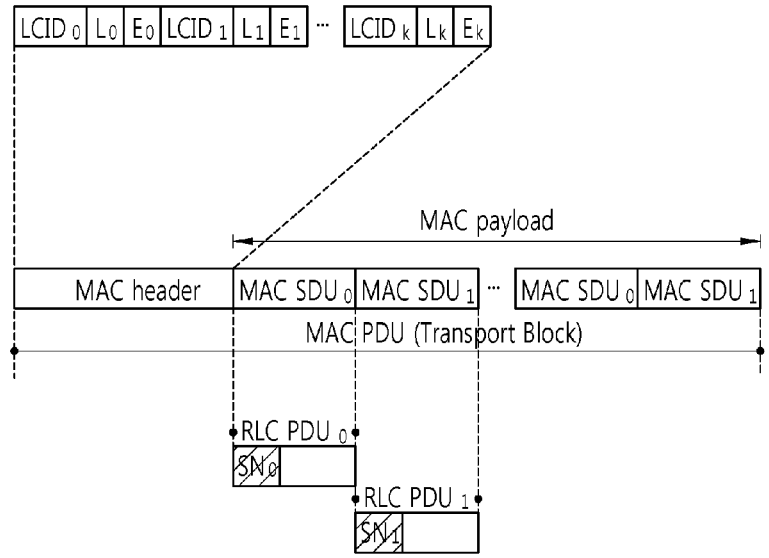
FIG. 10 shows a mapping relation between a MAC PDU and an RLC PDU according to an embodiment of the present invention.

FIG. 10 shows a mapping relation between a MAC PDU and an RLC PDU according to an embodiment of the present invention. The MAC PDU and the RLC PDU may be found in section 6.1.2 of 3GPP TS36.321 "Evolved Universal Terrestrial Radio Access (E-UTRA) Medium Access Control (MAC) protocol specification (Release 8, version 1.0.0, September 2007)".

Referring to FIG. 10, a MAC PDU (or TB) consists of a MAC header and a MAC payload. The MAC header includes a logical channel identification (LCID) field, a length (L) field, and an extended (E) field. The MAC payload includes a plurality of MAC SDUs and padding. The padding is added so that the MAC payload has a specific size. It is optional to include the padding in the MAC payload.

The LCID of the MAC header is a field for identifying a logical channel corresponding to the MAC SDU. That is, the LCID is mapped to an RLC entity on the logical channel. One LCID exists for one MAC SDU included in the MAC PDU.

The L of the MAC header is a field indicating a length of the MAC SDU. One L exists for one MAC SDU included in the MAC PDU. The E of the MAC header is an extended field indicating whether additional LCID and L fields exist in the MAC header. If the E field is set to 0, it implies that the E field is followed by another set of LCID, L, and E fields. If the E field is set to 1, it implies that the E field is followed by the MAC payload.

The MAC layer can find an RLC entity related to a specific MAC PDU from a MAC payload by using the LCID. The MAC layer identifies the RLC PDU according to an SN. When the MAC layer delivers local ACK/NACK information for a corresponding RLC PDU to the RLC layer, the SN of the RLC PDU is sent together. This is because, if only the local ACK/NACK information is received, there are some cases where the RLC layer cannot know which RLC PDU is retransmitted and which RLC PDU is newly transmitted. By using the local ACK/NACK information and the SN of the RLC PDU, the RLC layer can know an RLC PDU to be newly transmitted or an RLC PDU to be retransmitted.

In an exemplary method of obtaining the SN of the RLC PDU by the MAC layer, the MAC layer may directly decode an RLC header. In another exemplary method of obtaining the SN of the RLC PDU by the MAC layer, the RLC layer may simultaneously transmit the RLC PDU and the SN to the MAC layer when the RLC PDU is generated, and the MAC layer may store and use the RLC PDU and the SN.

When the RLC layer receives a local ACK including the SN from the MAC layer, the RLC layer transmits a new RLC PDU according to the method of performing the ARQ procedure of FIG. 4. When the RLC layer receives a local NACK including the SN from the MAC layer, the RLC layer retransmits an RLC PDU of the SN according to the method of performing the ARQ procedure of FIG. 7.

When the RLC layer delivers a specific RLC PDU and its SN to the MAC layer upon generation of the RLC PDU, the MAC layer stores the RLC PDU and its SN for each HARQ process ID and for each logical channel ID. Table 1 shows an example of a TB information table in which an SN of RLC PDU is stored for each HARQ process ID by the MAC layer of the present invention.

TABLE 1

| HARQ Process ID | Logical Channel ID | | | | | |
|---|---|---|---|---|---|---|
| | 0 | 1 | 2 | 3 | 4 | ... |
| | | | RLC PDU SN | | | |
| #1 | 2 | 4 | 5 | 2 | 3 | ... |
| #2 | 3 | 5 | 6 | 3 | 4 | ... |
| ... | ... | ... | ... | ... | ... | ... |

Referring to Table 1, a MAC PDU corresponding to a HARQ process ID #1 includes RLC PDU(SN=2), RLC PDU (SN=4), RLC PDU(SN=5), RLC PDU(SN=2), RLC PDU (SN=3), etc. That is, a combination of RLC PDU(SN=2), RLC PDU(SN=4), RLC PDU(SN=5), RLC PDU(SN=2), etc., is one MAC PDU(TB) to be transmitted to the HARQ process #1.

A MAC PDU corresponding to a HARQ process ID #2 includes RLC PDU(SN=3), RLC PDU(SN=5), RLC PDU (SN=6), RLC PDU(SN=3), RLC PDU(SN=4), etc.

Figure 11:
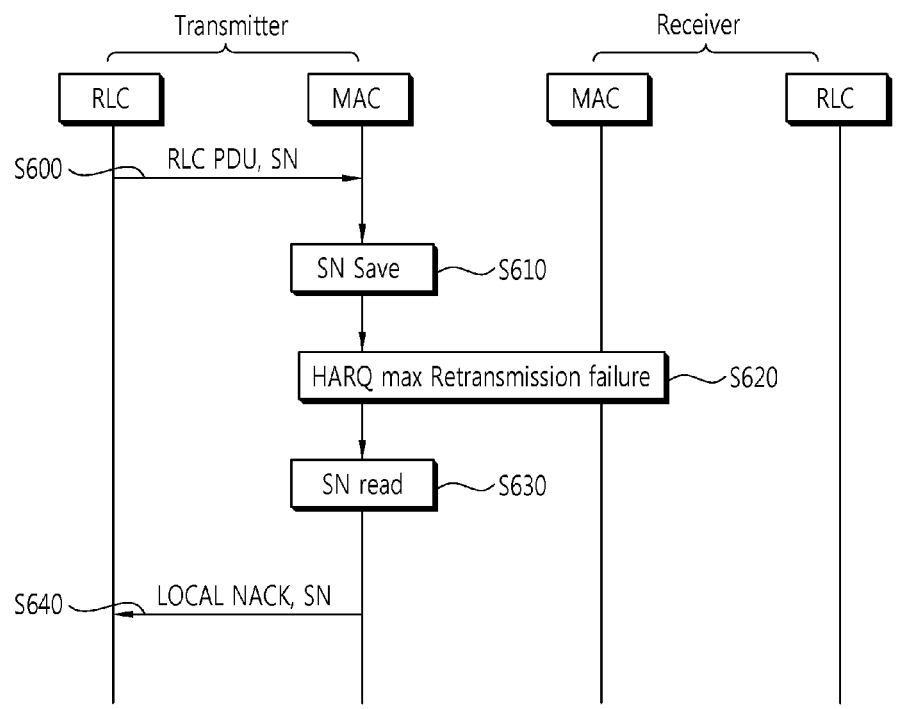
FIG. 11 is a flow diagram showing a method of performing RLC ARQ by using a TB information table.

FIG. 11 is a flow diagram showing a method of performing RLC ARQ by using a TB information table.

Referring to FIG. 11, an RLC layer of a transmitter sends an RLC PDU and an SN to a MAC layer (step S600). The MAC layer of the transmitter stores the SN (step S610). The SN is stored in the TB information table which is identified for each HARQ process ID and each logical channel ID. When transmission fails even if the MAC PDU is retransmitted a number of times corresponding to the maximum number of retransmissions (step S620), the MAC layer of the transmitter reads again the SN (step S630). The MAC layer first finds TB information by using a corresponding process ID, and then finds an SN to be retransmitted to each RLC entity by using a logical channel ID. The MAC layer sends a local NACK to the RLC layer together with the SN (step S640).

All functions described above may be performed by a processor such as a microprocessor, a controller, a microcontroller, and an application specific integrated circuit (ASIC) according to software or program code for performing the functions. The program code may be designed, developed, and implemented on the basis of the descriptions of the present invention, and this is well known to those skilled in the art.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A data transmission method using automatic repeat request (ARQ) in a radio interface protocol system comprising a plurality of layers, the method comprising:
    storing a plurality of data blocks in an ARQ buffer for transmission;
    delivering a first data block of the plurality of stored data blocks from a radio link control (RLC) layer to a medium access control (MAC) layer;
    transmitting the first data block by the MAC layer in response to an ARQ;
    delivering a second data block of the plurality of stored data blocks from the RLC layer to the MAC layer if a delivery success message is received from the MAC layer that indicates successful transmission of the first data block; and
    shifting a window of the ARQ buffer.

2. The data transmission method of claim 1, wherein both the first data block and the delivery success message include a sequence number indicating the first data block.

3. The data transmission method of claim 1, wherein the first data block is an RLC protocol data unit (PDU).

4. The data transmission method of claim 1, wherein shifting the window comprises shifting the window to a position at which the window includes the second data block in the ARQ buffer.

5. A data transmission method comprising:
    performing a hybrid automatic repeat request (HARQ) procedure on a medium access control (MAC) protocol data unit (PDU) by a MAC layer; and
    performing an ARQ procedure by a radio link control (RLC) layer for retransmitting an RLC PDU that corresponds to the MAC PDU if the RLC layer receives a delivery failure message from the MAC layer that indicates unsuccessful transmission of the MAC PDU; and
    performing the ARQ procedure by the RLC layer for transmitting a new RLC PDU if the RLC layer receives a delivery success message from the MAC layer that indicates successful transmission of the MAC PDU.

6. The data transmission method of claim 5, wherein performing the ARQ procedure for transmitting the new RLC PDU comprises shifting a position of a transmission (Tx) window such that the Tx window includes the new RLC PDU.

7. The data transmission method of claim 5, wherein the ARQ procedure is performed by an acknowledge mode (AM) RLC entity.

8. The data transmission method of claim 5, wherein the delivery success message includes a sequence number related to the RLC PDU that corresponds to the MAC PDU.

9. The data transmission method of claim 8, further comprising decoding the RLC PDU by the MAC layer in order to obtain the sequence number.

10. The data transmission method of claim 8, further comprising:
    delivering the sequence number from the RLC layer; and
    storing the delivered sequence number by the MAC layer.

11. An apparatus performing automatic repeat request (ARQ) in a radio interface protocol system, the apparatus comprising:
- an ARQ buffer configured to store a plurality of data blocks for transmission;
- a medium access control (MAC) layer configured to transmit a first data block of the plurality of stored data blocks in response to an ARQ; and
- a radio link control (RLC) layer configured to:
  - deliver the first data block to the MAC layer;
  - deliver a second data block of the plurality of stored data blocks to the MAC layer if a delivery success message is received from the MAC layer that indicates successful transmission of the first data block; and
  - shift a window of the ARQ buffer.

* * * * *